United States Patent
Hay et al.

(10) Patent No.: US 6,995,352 B2
(45) Date of Patent: Feb. 7, 2006

(54) FIBER OPTIC BASED METHOD AND SYSTEM FOR DETERMINING AND CONTROLLING POSITION OF A SLIDING SLEEVE VALVE

(75) Inventors: Arthur D. Hay, Cheshire, CT (US); Robert Robinson, Middletown, CT (US); Peter Ogle, Charlestown, RI (US)

(73) Assignee: Weatherford/Lamb, Inc., Houston, TX (US)

( * ) Notice: Subject to any disclaimer, the term of this patent is extended or adjusted under 35 U.S.C. 154(b) by 384 days.

(21) Appl. No.: 10/339,263

(22) Filed: Jan. 9, 2003

(65) Prior Publication Data

US 2004/0135075 A1    Jul. 15, 2004

(51) Int. Cl.
*G01J 1/04* (2006.01)
*G01J 1/42* (2006.01)
*G01J 5/08* (2006.01)

(52) U.S. Cl. .............................. 250/227.14; 250/559.29
(58) Field of Classification Search ............ 250/227.14, 250/227.15–19, 227.11, 231.19, 559.29; 385/4–13; 166/319–324, 373–375, 255.1; 73/705

See application file for complete search history.

(56) References Cited

U.S. PATENT DOCUMENTS

| | | | |
|---|---|---|---|
| 4,560,005 A | 12/1985 | Helderle et al. | ......... 166/332.2 |
| 4,848,457 A | 7/1989 | Lilley | ......................... 166/321 |
| 4,848,865 A | 7/1989 | Sepp | |
| 5,164,605 A * | 11/1992 | Kidwell | ....................... 250/577 |
| 5,211,241 A | 5/1993 | Mashaw, Jr. et al. | ....... 166/320 |
| 5,263,683 A | 11/1993 | Wong | .......................... 251/145 |
| 5,452,087 A * | 9/1995 | Taylor et al. | ............ 250/227.19 |
| 6,044,908 A | 4/2000 | Wyatt | ....................... 166/332.4 |
| 6,321,603 B1 * | 11/2001 | Berg | ..................... 250/231.19 |
| 2003/0127232 A1 * | 7/2003 | Bussear et al. | ............. 166/373 |

FOREIGN PATENT DOCUMENTS

WO    WO 02/044659    6/2002

OTHER PUBLICATIONS

U.K. Search Report, Application No. GB 0400486.7, dated Mar. 24, 2004.

* cited by examiner

*Primary Examiner*—David Porta
*Assistant Examiner*—Seung C. Sohn
(74) *Attorney, Agent, or Firm*—Patterson & Sheridan, L.L.P.

(57) ABSTRACT

An apparatus and method for determining the position of a hydraulically actuated sliding sleeve valve in real time is disclosed. The apparatus comprises, in a preferred embodiment, a reference sensor and a position sensor, both of which constitute fiber optic windings wound around the hydraulic fluid cavity used to activate the sleeve. The sensors measure the pressure exerted by the hydraulic fluid in the cavity, with the reference sensor circumferentially lengthening to create an optical time delay indicative of the base line pressure of the hydraulic fluid. As the sleeve moves, the position sensor becomes increasingly exposed to the hydraulic fluid pressure and also begins to experience a time delay, which can be compared to the reference sensor's time delay to determine sleeve position.

65 Claims, 5 Drawing Sheets

FIBER OPTIC BASED METHOD AND SYSTEM FOR DETERMINING AND CONTROLLING POSITION OF A SLIDING SLEEVE VALVE

FIELD OF THE INVENTION

This invention relates primarily to a sliding sleeve valve useful in conjunction with a production pipe used in oil/gas production.

BACKGROUND OF THE INVENTION

In hopes of producing oil and gas more efficiently, the petroleum industry continuously strives to improve its recovery systems. As such, those in the industry often drill horizontal, deviated, or multilateral wells, in which several wells are drilled from a main borehole. In such wells, the wellbore may pass through numerous hydrocarbon-bearing zones or may pass for an extended distance through one hydrocarbon-bearing zone. Perforating or "fracturing" the well in a number of different locations within these zones often improves production by increasing the flow of hydrocarbons into the well.

In wells with multiple perforations, however, managing the reservoir becomes difficult. For example, in a well having multiple hydrocarbon-bearing zones of differing pressures, zones of high pressure may force hydrocarbons into zones of lower pressure rather than to the surface. Thus, independent control of hydrocarbon flow from each perforation, or zone of perforations, is important to efficient production.

To independently control hydrocarbon flow from each perforation, or zone of perforations, those of skill in the art have inserted production packers into the well annulus to isolate each perforation. Valves disposed on the production tubing control flow into the tubing from each perforated zone. One type of valve used in the industry for this function is the sliding sleeve valve. Typical sliding sleeve valves are disclosed in U.S. Pat. Nos. 4,560,005, 4,848,457, 5,211,241, 5,263,683, and 6,044,908, which are incorporated by reference herein in their entireties. In such a valve, a sleeve capable of longitudinal movement with respect to the production tube is located between a sleeve housing and the production tube. One or more ports extend radially through the sleeve, the housing, and the production tube. When the sleeve is in an open position, the ports of the sleeve, housing, and production tube are aligned such that fluid may flow through the ports and into the production tube. When the sleeve is in a closed position, the ports of the sleeve are not aligned with the ports on the housing or production tube, preventing fluid flow into the production tube. Although the sleeve can be longitudinally slid between the open and closed positions by several different means, it is common for such control to be hydraulic, essentially pushing the sleeve in a piston-like motion between the housing and the production tubing.

In addition to this valve being utilizable fully open or fully closed, systems have been developed that allow for incremental valve positioning. For example, U.S. Pat. Nos. 5,211,241 and 5,263,683, incorporated by reference herein in their entireties, disclose sliding sleeve valves capable of such incremental positioning. However, over time, the exact incremental position of the valve becomes difficult to determine due to corrosion, scaling, seal wear, in-well contaminants, mechanical damage, hydraulic leaks or electronic component failures. Thus, the user might believe he is controlling the sleeve to a certain position, when in reality the valve is not properly positioned and therefore is allowing more or less ingress into the production tube than the user would find acceptable.

The ability to incrementally position the valves in different hydrocarbon bearing zones allows for greater control of overall fluid production by permitting the creation of pressure drops across certain production zones. Knowledge of the exact position of the valve is necessary to create optimal pressure drops, and thus to maximize production.

SUMMARY OF THE INVENTION

An apparatus and method for accurately determining the position of a hydraulically actuated sliding sleeve valve in real time is disclosed. The apparatus comprises, in a preferred embodiment, a reference sensor and, a position sensor, both of which constitute fiber optic windings wound around the hydraulic fluid cavity used to activate the sleeve. The sensors measure the pressure exerted by the hydraulic fluid in the cavity, with the reference sensor circumferentially lengthening to create an optical time delay indicative of the base line pressure of the hydraulic fluid. As the sleeve moves, the position sensor becomes increasingly exposed to the hydraulic fluid pressure and also begins to experience a time delay, which can be compared to the reference sensor's time delay to determine sleeve position.

In the preferred embodiment, the reference sensor and position sensors are multiplexed and bounded by fiber Bragg gratings (FBGs) so that the optical time delay in the sensors can be determined, e.g., by interferometric techniques. Alternatively, the FBGs can be used as the sensors themselves, e.g., in a wavelength division multiplexed arrangement. While the reference sensor is beneficial in that the actual pressure of the hydraulic fluid need not be known to accurately determine sleeve position, the position sensor has applicability even without the use of a reference sensor. Finally, a redundant or backup reference/position sensor assembly system may be included on both ends of the sleeve assembly to improve accuracy or reliability in the sleeve position determination.

DESCRIPTION OF ILLUSTRATIVE EMBODIMENTS

Figure 1:
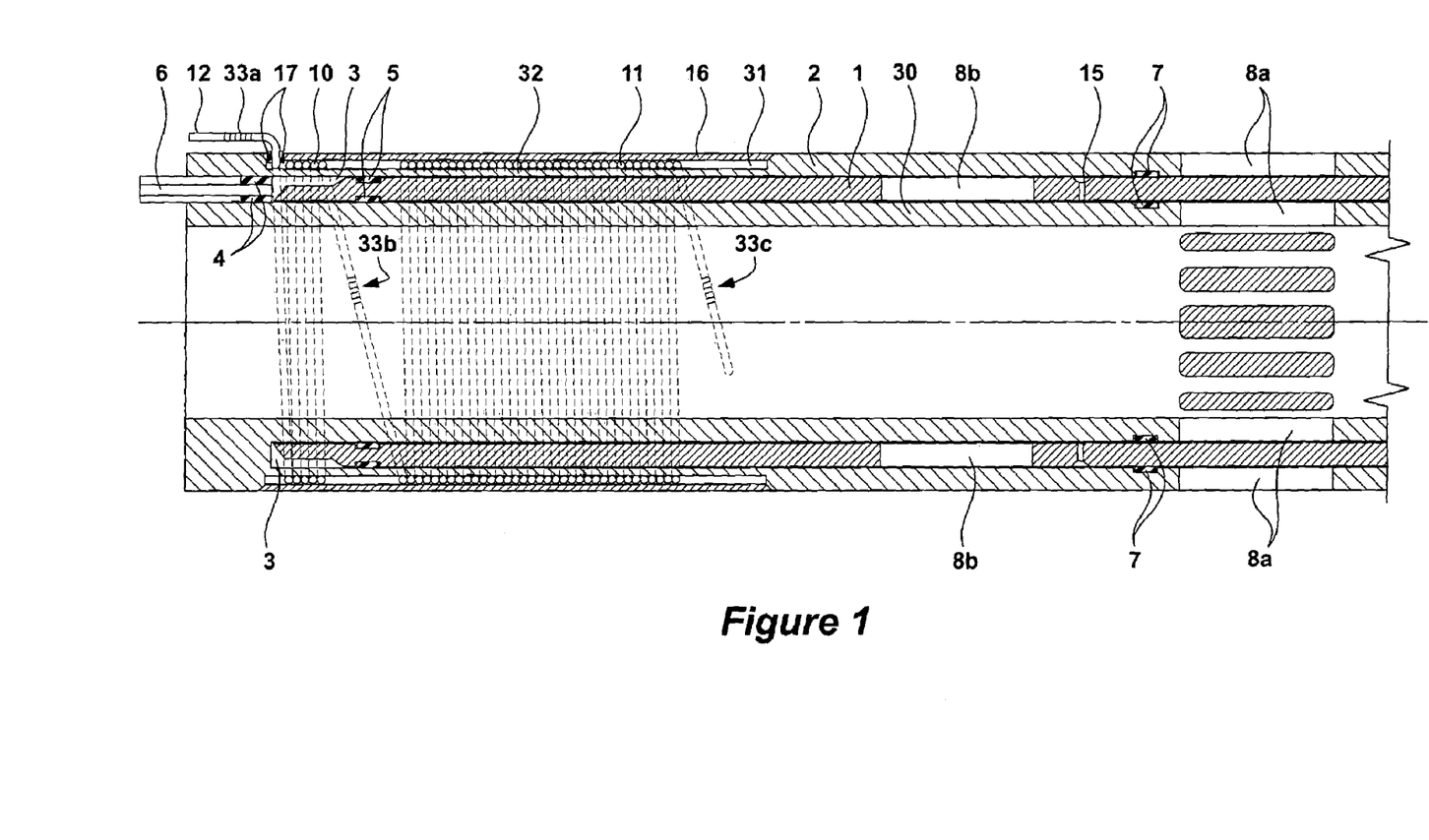
FIG. 1 is a cross-section of the disclosed position sensing system as used in conjunction with a sliding sleeve valve, which is illustrated in a closed position.

Referring to FIG. 1, a sliding sleeve 1 is positioned between a sleeve housing 2 and a production pipe 30. One skilled in the art will recognize that the housing 2 can be affixed to an otherwise standard section of production pipe 30, or may be integrally formed therewith as a single piece, i.e., as a special production tube section to be incorporated into the production string. Thus, as illustrated, the housing 2 and pipe 30 are integrated, but need not be so.

Within the housing 2 is a hydraulic cavity 3. The boundaries of the hydraulic cavity 3 are defined on one end by a sealable port 4, and on the other by one or more fluid-tight seal rings 5 (e.g. chevron seals) located on the sliding sleeve 1. Hydraulic fluid is forced into the hydraulic cavity 3 through a control line 6 that passes through the sealable port 4. Additional fluid tight seal rings 7 are located on the housing 2 to prevent hydrocarbons from entering the space between the sliding sleeve 1 and the housing 2. Radial ports 8a are located in both the production tube 30 and the housing 2, and a radial port 8b is located in the sliding sleeve 1. The ports 8a and 8b can be brought into alignment, and the valve accordingly opened, when the sleeve 1 is pushed into a certain linear position within the housing 2 by the introduction of hydraulic fluid into cavity 3. A pressure relief aperture 15 in the sliding sleeve, such as that disclosed in U.S. Pat. No. 5,263,683, incorporated by reference herein, allows gradual pressure equalization during the movement of the sleeve 1 and thus prolongs the life of the fluid-tight seal rings 7.

The disclosed embodiment employs a reference sensor 10 and a position sensor 11 to accurately determine the position of the sleeve 1, and hence can determine if the valve is fully closed, fully open, or at any point in between. In a preferred embodiment, both of the sensors 10, 11 comprise windings of fiber optic cable 12 such as standard 125-micron diameter communications fiber and are shown in phantom in FIG. 1. In a preferred embodiment, the sensors are multiplexed, i.e., constitute a single length of cable, although two separately controlled cables could also be used. As is well known, the sensors 10, 11 can be interrogated through cable 12 by any well-known optical source/detector apparatus (not shown in FIG. 1), which is preferably positioned at the top of a well in an oil/gas application.

The sensors 10, 11 are wrapped or wound around a recess 31 formed on the outside of the housing 2, and eventually are mechanically and/or hermetically protected by cover 16, which can be bolted, welded, or affixed by any well-known means to the housing 2. The housing may be pressurized or evacuated, or filled with an inert or other gases, as is disclosed in U.S. Pat. No. 6,435,030, which is incorporated herein by reference in its entirety. Hermetically sealing the recess 31 helps to protect the sensors and keeps them from being unduly influenced by sources external to the housing 2.

Both the reference sensor 10 and the position sensor 11 preferably constitute numerous windings around the housing 2, although only an illustrative number of windings are shown. The fiber optic cable 12 can be wound to form the sensors 10 and 11 in a number of different ways, and preferably in any of the manners disclosed in U.S. Pat. Nos. 6,354,147 and 6,435,030 and U.S. patent application Ser. Nos. 09/519,785, 09/740,760, 10/010,183, 10/060,114 and 10/115,727, which are hereby incorporated by reference in their entireties.

In practice, the sensors 10, 11 are stretched around the circumference of the recess 31 by virtue of the pressure of the hydraulic fluid introduced into cavity 3. In other words, the pressure of the hydraulic fluid pushes on the portion 32 of the housing 2 underneath the recess 31, and causes the sensors 10, 11 to stretch in length circumferentially around the recess 31. This circumferential lengthening can be used to accurately determine the position of the sleeve 1 as will be explained herein.

As noted, the sensors are multiplexed along the fiber optic cable 12, which is introduced into the recess 31 at feed-through assembly 17. A suitable high-pressure feed-through assembly is disclosed in U.S. patent application Ser. Nos. 09/628,114 and 09/628,264, which are incorporated by reference herein in their entireties. The fiber optic cable 12 preferably proceeds along the side of the production pipe between the surface instrumentation and the valve assembly, and may be protected within a sleeve or sheath and clamped or affixed to the production pipe as is well known. The sleeve or sheath of cable 12 may contain other fiber optic cables which communicate with other fiber-optic based sensors deployed downhole, or may constitute a return path for the sensors 10, 11, and/or may be routed to a similar sensor apparatus appearing on the other side of the sleeve apparatus (see FIG. 4, elements 18 and 19).

As shown in FIG. 1, the valve is closed. (The valve is partially opened in FIG. 4). When closed, the sleeve 1 preferably shoulders against the sealable port 4 or other portion of the housing 2, although this is not strictly necessary. In a preferred embodiment, the shape of the edge of the sleeve 1 is formed such that the hydraulic fluid is in communication with the portion 32 of the housing 2 underneath the reference sensor 10, for reasons that will be made clear later. While the disclosed shape of the sleeve edge effects this goal, other shapes to affect this same goal are easily recognizable by those skilled in the art.

In a preferred embodiment, the sensors 10, 11 are bounded by reflective devices, such as fiber Bragg gratings (FBGs) 33. As is described in the incorporated references, an FBG will reflect a portion of the light that impinges on it through cable 12, while transmitting other portions of the light to FBGs further down the cable. Thus, a series of pulsed reflections are sent back from the FBGs 33 through cable 12 to the surface where they can be assessed and analyzed. In the disclosed configuration, referred to as a time-of flight or time-division multiplexing arrangement, the change in the time delay between the reflected signals is proportional to the amount that the sensors 10, 11 have been circumferentially stretched, and hence is proportional to the pressure to which those sensors 10, 11 are subject by virtue of the hydraulic fluid in cavity 3. Other configurations for quantifying the amount of stretch of the sensors 10, 11 are disclosed in the incorporated references. An isolation pad is preferably placed between each FBG 33 and the portion 32 to accommodate housing growth and/or vibrations, such as that disclosed in U.S. patent application Ser. No. 09/726,060, which is disclosed herein by reference in its entirety.

Figure 2:
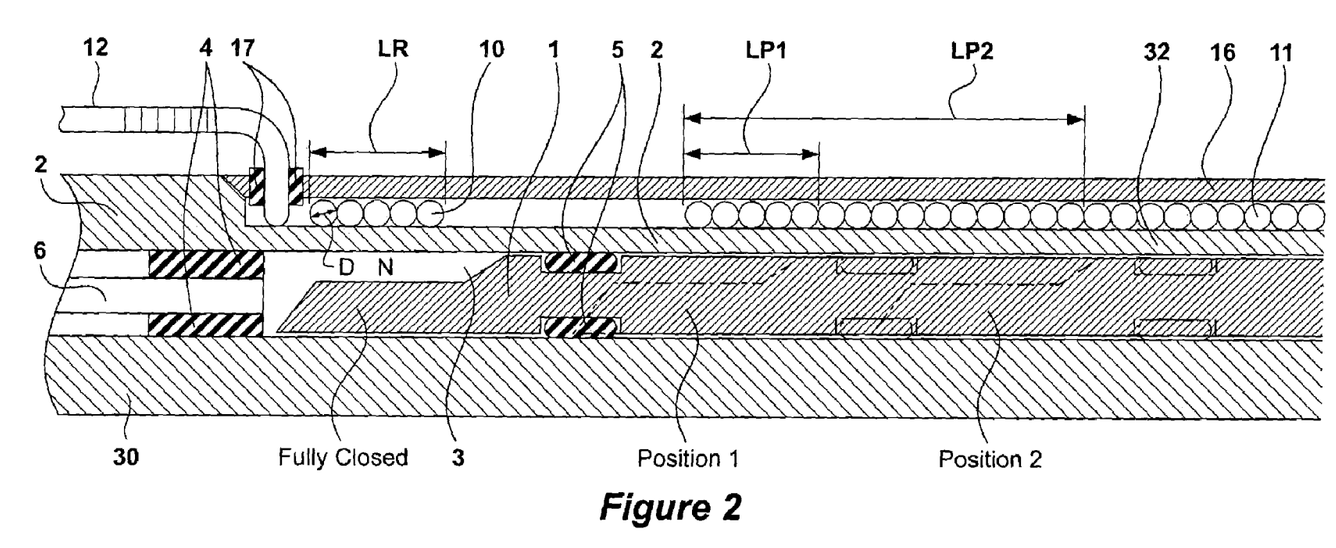
FIG. 2 is an enlarged cross-section of the sensors of the sensing system of FIG. 1.

FIG. 2 shows a higher magnification view of the reference sensor 10 and the position sensor 11 and their relation to the sleeve 1. As noted, the sensor 10, 11 are preferably wound so that a given single cable winding abuts or is laid next to the previous winding without substantial gaps between each winding as is shown. However, this is not strictly necessary, so long as the spacing between the windings is kept at known values in the sensors 10, 11. When wound in this fashion, it is noted that the reference sensor 10 spans a length along the axis of the housing, $L_R$, which is equal to the number of turns N times the diameter D of the fiber when no space appears between the fiber windings.

When the sleeve 1 is in the fully closed or shouldered position as shown in FIG. 2, and when hydraulic fluid is introduced into the cavity 3, the pressure of the fluid will increase the circumferential length of the reference sensor, $\Delta C_R$, as previously noted. This length increase results in a delay, $\Delta t_R$, in the time that it takes the interrogating light to travel through the reference sensor 10, i.e., from FBG 33a to 33b, when compared to the time it takes for the light to travel through the sensor without the application of hydraulic pressure. This relationship can be expressed mathematically as $\Delta t_R = \Delta C_R$/speed of light in fiber 12. By contrast, the position sensor 11 is substantially unaffected by the pressure of the hydraulic fluid when the sleeve is closed because it is isolated from the fluid by a chevron seal 5. In reality, the hydraulic fluid pressure may affect the position sensor 11 to some degree even when the sleeve 1 is closed. This is due to the proximity of the position sensor 11 to the chevron seal 5 and the fact that the portion 32 may be stressed near the proximity of the position sensor 11. This effect however is not particularly significant, especially considering that one skilled in the art will recognize that calibrating the position sensor 11 and the reference sensor 10 can mitigate the effect of small residual strains on portions of the position sensor 11 not directly exposed to the hydraulic pressure. Thus once calibrated, the position sensor 11 effectively does not experience a significant change in its circumferential length when hydraulic pressure is initially applied, i.e., $\Delta C_P = 0$, and $\Delta t_P = 0$.

Of course, the hydraulic pressure also causes the sleeve 1 to move in the housing, as is shown in phantom lines in FIG. 2. As the sleeve moves, eventually the portion 32 of the housing underneath the position sensor 11 starts to see the effects of the hydraulic pressure, e.g., when the left edge of the chevron seal 5 starts to clear the windings of the position sensor 11. For example, when advanced to Position 1 in FIG. 2, approximately five windings of the position sensor 11 are exposed to the hydraulic fluid pressure, and begin to experience some degree of circumferential lengthening, and consequently a finite time delay, $\Delta t_P$. The remaining windings in the position sensor 11 that are not (yet) subject to the hydraulic pressure do not experience significant circumferential lengthening and therefore do not contribute to the time delay in the position sensor.

The position of the sleeve within the housing 2 can be accurately determined by determining $\Delta t_R$ and $\Delta t_P$ at any point along the sleeve 1's trajectory. If we assume that the windings in the reference sensor 10 and the position sensor 11 are as shown in FIG. 2, then the length of the position sensor 11 that has been spanned, $L_P$, can be determined as follows: $L_P = L_R * \Delta t_P / \Delta t_R$. Therefore, in Position 1, because five windings of both the reference sensor 10 and the position sensor 11 are subject to the hydraulic pressure, they will experience the same amount of lengthening and time delay. Hence, $\Delta t_P = \Delta t_R$ and $L_{P1} = L_R$. In Position 2, because five windings of the reference sensor 10 and fifteen windings of the position sensor 11 are subject to the hydraulic pressure, $\Delta t_P = 3\Delta t_R$ and $L_{P2} = 3L_R$. In summary, by knowing the length of the reference sensor 10, by measuring the respective time delays experienced in the reference sensor 10 and the position sensor 11, and by knowing the position of the position sensor 11 relative to the position of the sleeve 1, the position of the sleeve can be accurately determined in real time.

Figure 5:
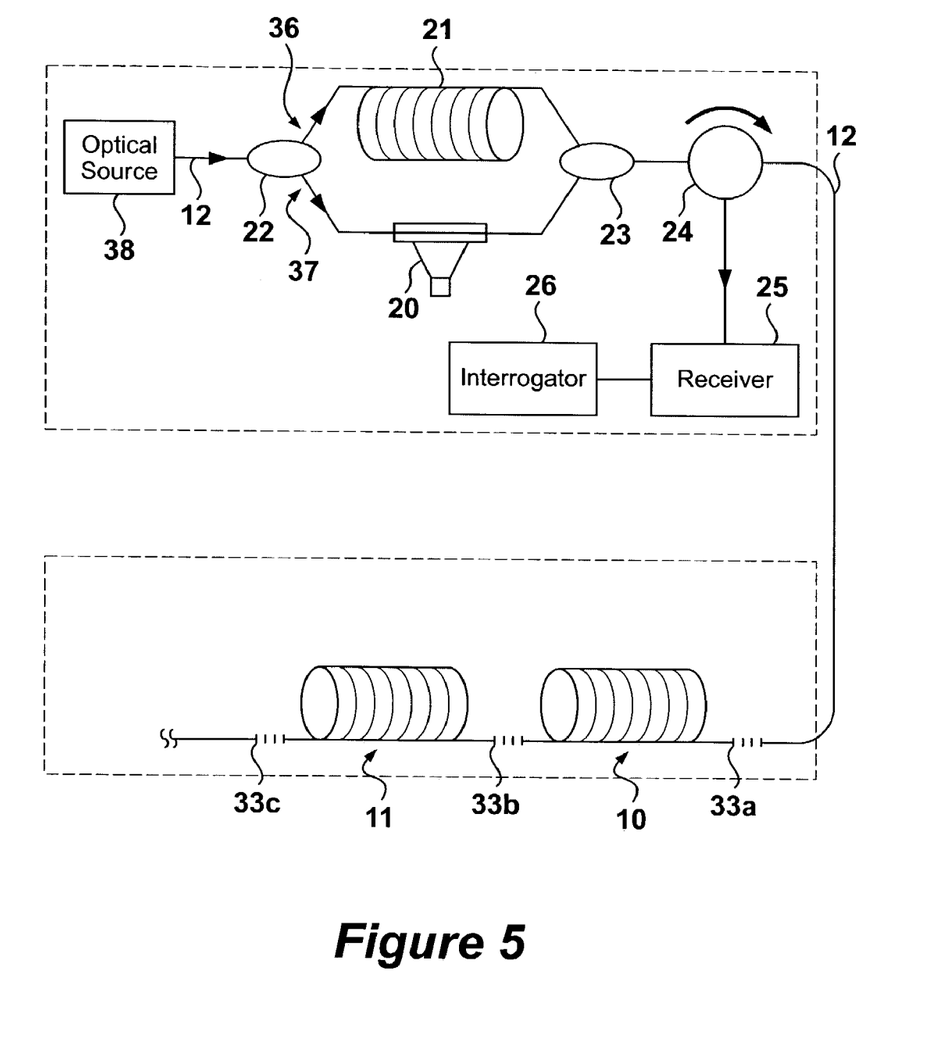
FIG. 5 illustrates a preferred unbalanced interferometric system to interrogate the sensors of the sensing system of FIG. 1.

The present invention may also employ an interferometric method to determine the position of the sliding sleeve, such as disclosed in U.S. patent application Ser. No. 09/726,059, entitled "Method And Apparatus For Interrogating Fiber Optic Sensors," filed on Nov. 29, 2000 and incorporated herein by reference in its entirety. As described previously, the hydraulic pressure introduced into the cavity 3 causes the fiber to lengthen, shorten, or otherwise strain the fiber. As described above this strain induces a time delay in the sensors 10, 11. This change in length and corresponding time delay also induces a phase shift in the light path as well. By comparing the phase shift of the reference sensor 10 to the phase shift of the position sensor 11, the position of the sliding sleeve can be determined to a greater degree of sensitivity. FIG. 5 illustrates one embodiment for measuring this phase shift and is described in detail below. To aid in the understanding of FIG. 5, a brief illustration of the basics of interferometry as applicable to this embodiment of the present invention follows.

Light of the same wavelength will generally follow the same path through an optical fiber, so if timed correctly the pulse reflections from each pair of FBGs 33 that to bracket the sensors 10, 11 will return to the photo receiver 25 at the same time. If the path length of the position sensor 11 and the reference sensor 10 is exactly the same, or differs by an integral number of wavelengths, the recombined pulses of each of the sensors are exactly in phase and the pulse intensity is at its maximum. However, if the two pulses are at one half wavelength out of phase, the recombined pulse is at its minimum. In short, and as is known, the recombined pulse can be assessed by the photo receiver 25 for a phase shift, $\Delta \phi$, which will be indicative of the change in length of either of the two sensors 10, 11.

The embodiment of the present invention illustrated in FIG. 5 implements this basic interferometric method. The only difference is that in the present invention the reference sensor 10 will be subjected to strain fairly continuously so that the reference sensor 10 will nearly always have a change of length $\Delta L_R$, while the position sensor 11 will experience a change in length $\Delta L_P$ depending on the position of the sliding sleeve 1. If the sleeve is closed, then $\Delta L_P$ equals zero, as there is no strain, and if fully opened $\Delta L_P = \Delta L_R$. Measuring the phase shift $\Delta \phi$ of both the reference sensor 10 and the position sensor 11 directly, instead of the change in time, enables one to calculate changes in length as small as $10^{-13}$ meters with this interferometric method, and hence determine the position of the sleeve within the housing.

In this embodiment an optical source 38, such as a laser, provides a series of light pulses to the fiber 12. The drive current of the source itself may pulse the light or one may employ a gate mechanism to pulse the light. Each pulse of light travels through the fiber 12 to a first coupler 22 where the light is split into two separate paths of light, a reference pulse 37 and a signal pulse 36. A phase modulation device 20 imparts a phase modulation carrier to the reference pulse 37. The reference pulse 37 will travel to the sensors 10, 11 before the signal pulse 36 because the signal pulse 36 is directed to a path that includes a time delay, which is shown as a coiled length of fiber referred to as a delay coil 21. The delay coil 21 provides a known differential time of flight between the two paths. In this embodiment, it is advantageous to match the differential time of flight between the two paths through the delay coil 21 with the round trip time of flight of the reference sensor 10 and the position sensor 11 to have proper interference. Therefore, it is also advantageous to match the length of the reference sensor 10 with the length of the position sensor 11. Although the sensor lengths should be phase matched, they do not necessarily have to have the same axial length, i.e. the reference sensor 10 may be coiled in layers of wraps.

A second coupler 23 directs the signal pulse 36 and the reference pulse 37 onto the fiber 12, but now the signal pulse 36 is delayed by a time equal to the length of the delay coil 21. The pulses 36, 37 then travel through a directional coupler 24, which may comprise any number of devices such as an optical splitter or an optical circulator, and on to the reference sensor 10 and the position sensor 11 where the pulses 36, 37 are reflected by the FBGs 33. In the embodiment shown, all of the FBGs 33 are designed to reflect the same wavelength. Each FBG 33 reflects a portion of light back through the fiber 12 where the directional coupler 24 redirects the reflected light to a receiver 25 and on to an interrogator 26.

The reference sensor 10 is interrogated in the following manner. The first pulse to reach the FBGs 33 is the reference pulse 37. When the reference pulse 37 travels through the fiber 12 to the first FBG 33a, a portion of the pulse is reflected back to the receiver 25. This reflected portion may be called for illustrative purposes the first pulse reflected from the first grating. The remaining portion of the reference pulse 37 travels through the reference sensor 10 to the second FBG 33b. At the second FBG 33b a portion of the light is again reflected back to the receiver and may be referred to as the first pulse from the second grating. Meanwhile the signal pulse 36 is delayed by a time equal to the length of the delay coil 21. Therefore when the reference pulse 37 reflects off of the second FBG 33b and arrives at the first FBG 33a, the signal pulse 36 has just reached the first FBG 33a where a portion of the signal pulse 36 is reflected and may be referred to as the second pulse from the first grating. The second pulse from the first grating and the first pulse from the second grating return to the receiver 25 at the same time creating an optical interference pattern. From a series of pulses operating in the above described manner, the change in phase caused by varying hydraulic pressure can be measured as a phase change of $\Delta\phi_R$, which can be correlated to a change in length $\Delta L_R$ as will be discussed below.

The position sensor 11 is interrogated in the same manner. A portion of the reference pulse 37 continues through the second FBG 33b and through the position sensor 11 where the third FBG 33c reflects a portion of the pulse 37. This portion may be referred to as the first pulse from the third grating. Meanwhile a portion of the signal pulse 36 travels through the first FBG 33a and reference sensor 10 and then is reflected by the second FBG 33b. This reflected portion may be referred to as the second pulse reflected from the second grating and returns to the receiver 25. The first pulse from the third grating returns to the receiver 25 at the same time as the second pulse from the second grating and they interfere with each other creating an optical interference pattern. The strain in the position sensor 11, due to the position of the sliding sleeve, produces a phase shift $\Delta\phi_P$ in the returning first reference pulse 37 relative to the returning second signal pulse 36, allowing $\Delta L_P$ to be determined.

The change in length of fiber $\Delta L$ of the sensors 10, 11 may be determined as follows. The phase angle $\phi$ for a lightwave traveling through the fiber 12 is defined by the following equation, $$\phi = \frac{2\pi n_1 L}{\lambda_0}$$

where $n_1$ is the index of refraction of the fiber core, L is the length of the sensor 10, 11 and $\lambda_0$ is the wavelength of light in vacuum. A change in length of the fiber 12, such as when the sensor 10, 11 is strained by hydraulic pressure, is represented by the following, $$\phi + \Delta\phi = \frac{2\pi}{\lambda_0}[n_1 L + n_1 \Delta L]$$

where $\Delta\phi$ is the change in phase measured by the interrogator 26 and the remaining variables are known so that $\Delta L$ may then be calculated. By comparing the change in length of the reference sensor 10 $\Delta L_R$ with the change in length of the position sensor 11 $\Delta L_P$ the position of the sliding sleeve 1 can be determined using the equations disclosed previously.

Although the present invention has been described above with reference to the embodiment in FIG. 5, the present invention is not limited to that particular embodiment as several aspects depicted are not required. For example, the present invention does not necessarily require a reference sensor 10 as the position sensor 11 alone can enable one to determine the position of the sleeve by monitoring the phase shift and/or intensity of the reflected pulses from FBGs 33b and 33c. Furthermore, the present invention does not necessarily require a delay coil 21, so long as the pulses are separated in accordance with the time-of-flight through the sensors 10, 11 such that proper interference is still achieved.

One benefit of the above-disclosed sleeve positioning techniques is that it does not require actual knowledge of the pressure of the hydraulic fluid that is being used to manipulate the sleeve 1. In fact, the technique will perform adequately even if the pressure of the hydraulic fluid changes over time as the sleeve is manipulated. A changing hydraulic pressure will result in proportional changes in either $\Delta t_P$ and $\Delta t_R$, or $\Delta\phi_P$ and $\Delta\phi_R$, and because these measured parameters are divided, such proportional changes are rendered irrelevant.

One skilled in the art will appreciate that changes may be made to the disclosed apparatus without changing its basic functionality. For example, and as noted earlier, it is preferred to abut windings within a given sensor 10, 11 together to simplify the winding procedure and to know with some exactness how much of the housing 2 is being spanned by the windings of the sensors, but this is not strictly necessary. For example, the windings may wound on top of one another, so long as it is known how many windings are present for a given length of the housing 2. Likewise, the windings may be spaced at a known distance. Furthermore, the spacing of the windings may be different in the two sensors. For example, if the ratio of the number of windings per unit length in the reference sensor 10 is $\alpha$ times larger than that in the position sensor 11, the computation of $L_P$ is scaled accordingly: $L_P = \alpha L_R^* \Delta t_P / \Delta t_R$.

As one skilled in the art will realize, a suitable number of windings should be used in both of the sensors 10, 11 such that resolvable time shifts will result when the sensors are subject to the hydraulic pressure in cavity 3. Resolvable time shifts also dictate that the housing 2 have a suitable compliancy to suit the application at hand. The housing 2, and specifically portion 32, must have sufficient structural integrity to handle the pressure gradient across it, and yet must also be able to deflect (i.e., change in circumference) by an amount that imparts a resolvable circumferential lengthening in the sensors 10, 11. Accordingly, the thickness of portion 32 and its modulus of elasticity will need to be taken into account for a given application. The exact parameters and materials to be used in a commercial embodiment therefore may require some calculation or experimentation, but such calculation or experimentation is well within the skill of those in the art.

Figure 3A:
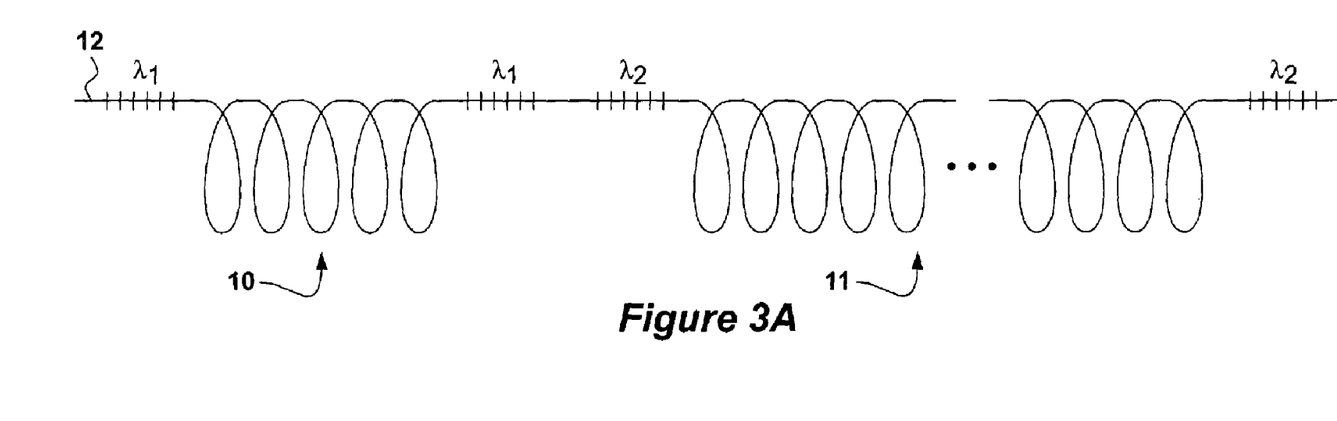
FIG. 3a discloses, an alternative, arrangement for the FBGs used in the reference and position sensors.

As a review of U.S. Pat. Nos. 6,354,147 and 6,435,030 and U.S. patent application Ser. Nos. 09/519,785, 09/740,760, 10/010,183, 10/060,114 and 10/115,727 reveals that FBGs may be used in other manners useful to the application of detecting the position of a slidable sleeve. For example, and as diagrammed in FIG. 3A, the reference sensor 10 and the position sensor 11 may be bound by two different FBGs having differing reflection wavelengths, $\lambda_1$ and $\lambda_2$. This can assist in determining the relevant time-of-flight of the interrogating light within the sensors, because it can be known with certainty, and without the need to count reflected pulses, that the time delay between pulses corresponding to $\lambda_1$ corresponds to the reference sensor 10 and that the time delay between pulses corresponding to $\lambda_2$ corresponds to the position sensor 11. Furthermore, and as recognized in FIG. 3B, the FBGs themselves can be used as the sensing elements in a wavelength-division multiplexing (WDM) approach. In this regard, and as is well known, when a FBG is subject to tension, its reflection wavelength shifts, and this shift can be related to a pressure, such as the pressure of a fluid within a pipe as the incorporated reference recognize. Accordingly, the reference sensor 10 can include one or more FBGs (e.g., $\lambda_1$ to $\lambda_3$) to quantify the pressure that the cavity 3 is subject to. (Really, only one FBG would be necessary, but a plurality might be useful as backup or for confirmation). Then, as the sleeve moves, FBG within the windings of the position sensor 11 (e.g., $\lambda_4$ to $\lambda_N$) are sequentially exposed to the hydraulic pressure. Spacing the FBGs at known intervals within the position sensor can thus be used to calculate the position of the sensor. Thus, when the wavelength shift at the first FBG in the position sensor (e.g., $\Delta\lambda_4$) correlates to the same pressure as measured by the FBG(s) in the reference sensor, it is known that the sleeve 1 has advanced as far as that first sensor. When the wavelength shift at the second FBG in the position sensor (e.g., $\Delta\lambda_5$) correlates to the same pressure as measured by the FBG(s) in the reference sensor (and the pressure as measured by the first FBG), it is known that the sleeve has advanced as far as that second sensor, and so on. While it may be preferable to make different all of the reflection wavelengths of the FBGs in the WDM approach of FIG. 3B, this is not strictly necessary. In fact, some of the reflection wavelengths in the sensors could be the same, or all could be the same, although in this instance the FBGs would preferably be made of a lower reflectivity to ensure suitable optical power to interrogate all of the FBGs in the cable 12. Still other multiplexing and structural approaches are possible, as the above-incorporated references recognize.

Alternatively, the reference sensor 10 and position sensor 11 do not need to be the same types of sensors. For example, reference sensor 10 could comprise a time of flight sensor (such as in FIG. 3A) while the position sensor comprises a wavelength sensitive sensor (such as in FIG. 3B), or vice versa. Or, the reference sensor could comprises a different type of pressure sensor, such fiber-optic-based or other sensors that tap into the hydraulic chamber to measure the pressure of the hydraulic fluid directly. While the ability to simply compare relative time delays might be lost in such configurations, suitable calibration can allow differing types of sensors to be used simultaneously to determine sleeve position, and in a multiplexed fashion, as one skilled in the art would realize.

Other modifications to the disclosed technique are possible. For example, the shape of the end of the sleeve 1 may be made in any number of ways to permit the hydraulic fluid to communicate with the reference sensor 10 in the cavity 3, and in this regard it should be noted that the space between the sleeve end and portion 32 of the housing can be very thin and still couple the hydraulic pressure to the portion 32 up to the chevron seal 5. Furthermore, it is not strictly necessary in all useful embodiments that the end of sleeve 1 be shaped to permit the hydraulic fluid to communicate with the reference sensor 10 when the sleeve is in the fully closed position. Instead, for example, the reference sensor can be gradually subject to the pressure of the hydraulic fluid as it is introduced into the cavity 3, with the understanding that the reference sensor 10 is fully exposed to the hydraulic fluid, and ready for referencing, after the time delay $\Delta t_R$ has ramped up and has reached a reasonably steady value or other value considered to be indicative of the full exposure of the reference sensor 10 to the pressure of the hydraulic fluid. Moreover, it is not strictly necessary that the entirety of the reference sensor be placed over portion 32 of the housing 2, although it should be recognized that only those portions of the reference sensor 10 that are in communication with the hydraulic fluid will partake pressure monitoring.

Figure 3B:
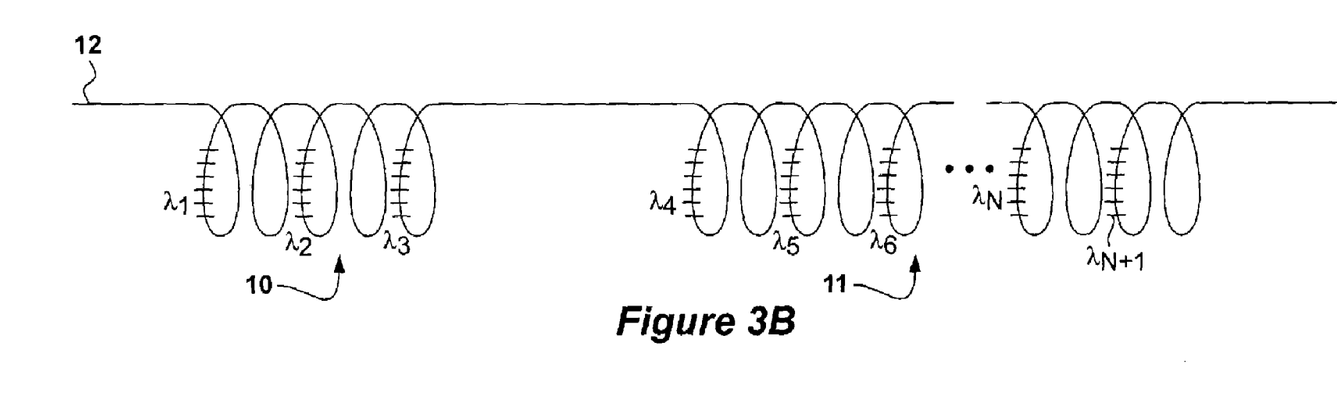
FIG. 3b discloses a WDM arrangement for the FBGs used in the reference and position sensors.

Similarly, location of the position sensor 11 may be varied to suit the application at hand. In this regard, it is not strictly necessary that the position sensor 11 be completely isolated from the cavity 3 when the sleeve is in the fully closed position. Some portion of the position sensor may be made to overlap the cavity even when the sleeve is fully closed, although it should be recognized that those overlapping windings will immediately be subject to lengthening, and promote time delay in the position sensor, although this time delay can be treated as a baseline by which further increases in time delay are measured. Indeed, the windings of the position sensor 11 may be brought into contact with the windings of the reference sensor 10, or may even overlap. The position sensor may further be broken down into, or considered as, a plurality of sensors, each of which may be bounded by, or constitute, FBGs. FIG. 3B provides a good example of this, as each FBG can be considered a position sensor.

Finally, it should be noted that it is not strictly necessary to have a reference sensor 10 in all possible useful applications. For example, the reference sensor 10 of FIGS. 1 and 2 could be eliminated, and the device would still have utility in determining the position of the sensor. In such an application, the position sensor could be pre-calibrated to determine what hydraulic pressure, $P_H$, causes a particular time delay per unit length of the position sensor 11, i.e., $\Delta t_P/L_P=f(P_H)$. By knowing, or measuring, the pressure of the hydraulic fluid within the cavity, the time delay, $\Delta t_P$, can then be measured within the pressure sensor and its position, $L_P$, calculated using the calibration information. In this regard, a pressure sensor, many of which are known, can be used to measure the hydraulic pressure. Indeed, fiber-optic-based pressure sensors could be multiplexed together with the position sensor 11 to provide accurate measurement of the hydraulic pressure within cavity 3. Thus, in its broadest sense, this disclosure envisions the use of a single continuous winding to measure the position of the sleeve.

Figure 4:
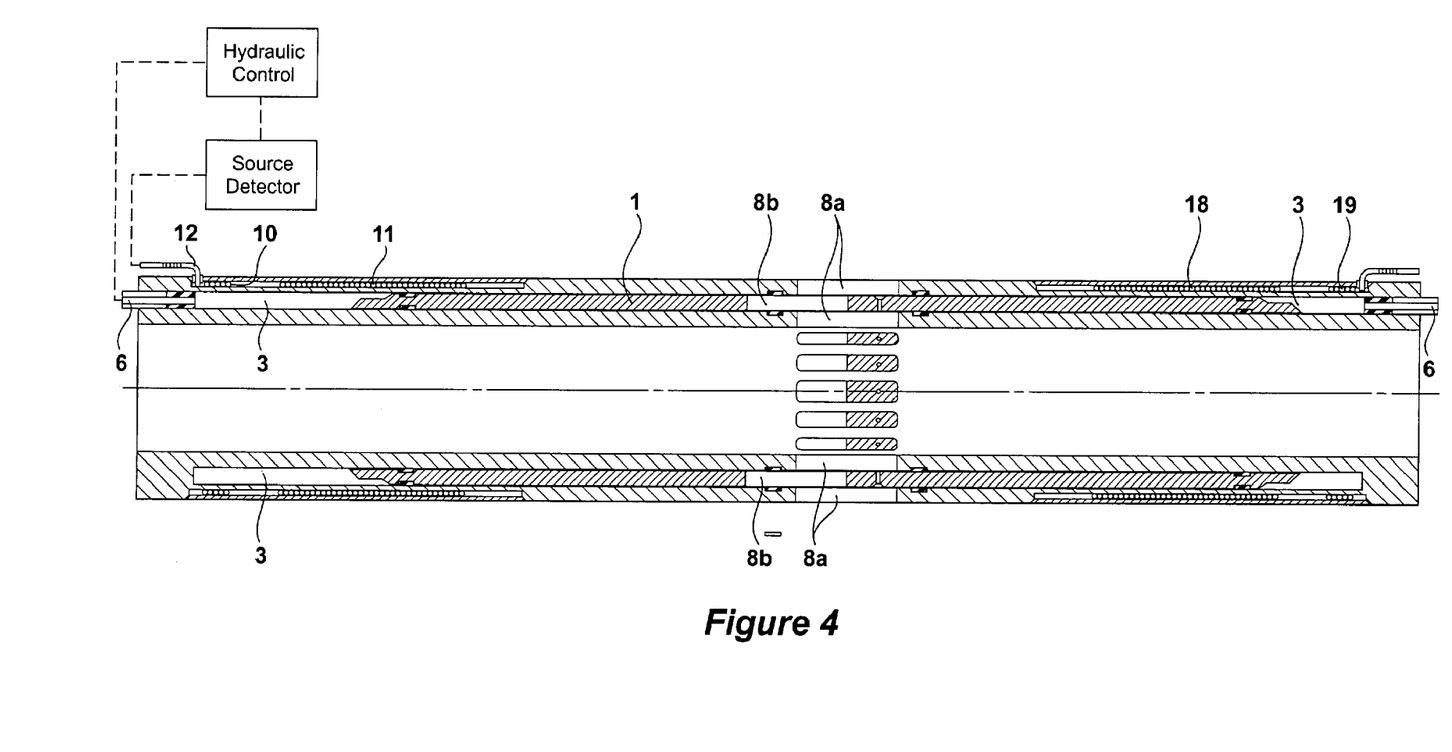
FIG. 4 is a cross-section of the disclosed position sensing system as used in a dual-ended configuration, and in which the sliding sleeve is illustrated in a half-opened position.

FIG. 4 discloses a dual-ended sliding sleeve embodiment, which essentially comprises the structures disclosed earlier but repeated on both ends of the sliding sleeve apparatus. Thus, two reference sensors 10, 19 and two position sensors 11, 18 are shown. (For clarity, the windings of sensors 10, 11, 18 and 19 and their associated FBGs are not shown). This embodiment provides a beneficial means for pushing the sleeve 1 within the housing 2. In a single-ended embodiment, a sliding sleeve apparatus deployed downhole will potentially subject the cavity 3 to a high pressure as the cavity must contend with the hydrostatic weight of the fluid communicating with the cavity through port 6. However, when hydraulic fluid is presented to both ends of the assembly, the effect of the hydrostatic weight will tend to cancel one another. This provides several benefits. For example, a complicated return mechanism for the valve (e.g., a large spring to counteract the hydrostatic weigh of the hydraulic fluid to force the sleeve into the closed position) is unnecessary. Second, relatively small forces are needed to slide the sleeve within the housing, because the hydrostatic weight has already largely been canceled. Third, the pressure within each of the hydraulic cavities 3 need not be designed to tolerate the high pressures that otherwise would be demanded by a single-ended embodiment, and hence can be made less robust and therefore more sensitive in measuring the effects that hydraulic fluid has on moving the sleeve.

Other benefits are realized by the dual-ended sliding sleeve embodiment of FIG. 4. Because the disclosed embodiment contains two reference sensors 10, 19 and two position sensors 11, 18, redundant sleeve position measurements can be taken to verify the accuracy of the position determination or to average the results to improve accuracy. Additionally, this redundancy can be useful should one of the sensors malfunction. The reference/position sensor sets can be multiplexed together using any of the techniques discussed above, or they can be independently interrogated using separate fiber optic cables 12. If multiplexed, a sealable channel (not shown) could be formed in the housing 2 to route the cable 12 through the middle of the housing 2 between the two recesses 31, in which case, the channel is preferably made to run in areas where the radial ports 8a are not present. Alternatively, the recesses 31 could be optically coupled by passing the cable through additional feedthroughs 17 (not shown).

While a method of accurately determining the position of a sliding sleeve valve is disclosed, one skilled in the art will understand that it is a simple manner to use the determined position to accurately control the position of the sleeve. For example, and as shown in FIG. 4, cable 12 can be coupled to optical source/detector. The position information as determined by source/detector can be passed to or incorporated with hydraulic control, which includes a user interface for selling the position of the sleeve 1. In this regard, if the user sets a particular position for the valve (e.g., 60% open), the hydraulic control will engage the hydraulic system to press a certain amount of hydraulic fluid into the cavity 3 to push sleeve 1. Once the hydraulic control believes that the sleeve has been accurately forced to the desired position, the source/detector can be activated to determine the true position of the sleeve, and may find for example that the sleeve is actually only 55% open. This information can then be passed to hydraulic control, which can continue to press on the sleeve until the source/detector verifies that the 60% goal for the sleeve 1 has been reached. Alternatively, the position of the sleeve 1 would be monitored in real time, with the source/detector shutting off the hydraulic control when the correct position is reached.

The disclosed apparatuses and methods have additional benefits beyond measuring the quasi-static strain induced by the hydraulic fluid and the position of the sliding sleeve. The disclosed apparatuses may also detect dynamic or time-varying pressures of fluid flowing within the production tubing or through the valve. In this regard, one skilled in the art will recognize that the disclosed sensor structures are similar to the structures disclosed in the following references, which are hereby incorporated by reference in their entireties: U.S. patent application Ser. No. 09/997,221, entitled "Method And System For Determining The Speed Of Sound In A Fluid Within A Conduit," filed Nov. 28, 2001; U.S. patent application Ser. No. 09/729,994, entitled "Method And Apparatus For Determining The Flow Velocity Within A Pipe," filed Dec. 4, 2000; U.S. patent application Ser. No. 10/115,727, entitled "Flow Rate Measurement Using Unsteady Pressures," filed Apr. 3, 2002; and U.S. Pat. No. 6,354,147, issued Mar. 12, 2002. As these references explain, various acoustic disturbances in a fluid flowing within a pipe (e.g. naturally occurring pressure vortices flowing with the fluid, and/or other acoustic phenomenon traveling through the fluid at the speed of sound) can be detected by wrapping fiber optic cable around a pipe. These acoustic disturbances in the present apparatus will additionally couple through the sleeve 1 and the portion 32, thereby rendering them detectable by the sensors 10 and/or 11, even if slightly attenuated by virtue of traveling through these additional structures. Thus, by using the above-referenced techniques, additional information concerning the fluid within the production pipe 30 can be determined, such as the flow rate of the fluid. In short, the disclosed apparatuses can be used to both determine the position of the sleeve, as well as to verify that fluid is flowing through the production pipe and/or the valve. This additional functionality may be beneficial in its own right, but importantly, can be used to verify that the sleeve is properly positioned. For example, an operator may believe that the valve has been opened, but if no dynamic acoustic disturbances can be seen, this may indicate that the valve has not been opened, or that something else might be obstructing the valve or the production pipe. As one skilled in the art will understand from a review of the above-incorporated references, additional modifications may be made to the disclosed position-sensing apparatus to facilitate this additional functionality. For example, it may be useful to use additional windings of fiber optic cable beyond those used for the position and/or reference sensors solely for the purpose of facilitating the detection of dynamic events indicative of fluid flow.

While of particular utility to sliding sleeves usable in oil/gas wells, it should be recognized that the concepts disclosed herein have applicability to determining the position of other hydraulically-activated structures, such as pistons, cam shafts, etc, including structures that are hydraulically activated using gases or liquids.

Although the invention has been described and illustrated with respect to exemplary embodiments thereof, the foregoing and various other additions and omissions may be made therein and thereto without departing from the spirit and scope of the present invention as defined in the attached claims.

What is claimed is:

1. An apparatus for determining the position of a slidable first member relative to a second member, comprising:
  a hydraulic cavity accessible to slide the first member relative to the second member; and
  at least one optical sensor for sensing pressure in the hydraulic cavity to measure the position of the first member relative to the second member, wherein the at least one optical sensor comprises a winding of fiber optic cable and is wound around the hydraulic cavity.

2. The apparatus of claim 1, wherein the hydraulic cavity and the first member are concentric with the second member.

3. The apparatus of claim 1, wherein the hydraulic cavity and the first member surround the second member.

4. The apparatus of claim 1, wherein the optical sensor is bounded by reflectors.

5. The apparatus of claim 4, wherein the reflectors are FBGs.

6. The apparatus of claim 1, wherein the optical sensor comprises at least one FBG.

7. The apparatus of claim 1, wherein the optical sensor spans a length of the hydraulic cavity, and wherein the optical sensor measures the position by becoming exposed along the length to the pressure in the hydraulic cavity as the first member slides relative to the second member.

8. The apparatus of claim 1, wherein the optical sensor measures the position by measuring a time delay.

9. The apparatus of claim 1, wherein the optical sensor measures the position by measuring a phase shift.

10. The apparatus of claim 1, wherein the optical sensor measures the position by measuring a wavelength shift in the optical sensor.

11. The apparatus of claim 1, wherein the apparatus comprises first and second optical sensors for sensing pressure in the hydraulic cavity.

12. The apparatus of claim 11, wherein the hydraulic cavity and the first member are concentric with the second member.

13. The apparatus of claim 11, wherein the hydraulic cavity and the first member surround the second member.

14. The apparatus of claim 11, wherein either or both of the first and second optical sensors comprise a winding of fiber optic cable.

15. The apparatus of claim 14, wherein either or both of the first and second optical sensors are wound around the hydraulic cavity.

16. The apparatus of claim 11, wherein either or both of the first and second optical sensors are bounded by reflectors.

17. The apparatus of claim 18, wherein the reflectors are FBGs.

18. The apparatus of claim 11, wherein either or both of the first and second optical sensors comprise at least one FBG.

19. The apparatus of claim 11, wherein the second optical sensor spans a second length of the hydraulic cavity, and wherein the second optical sensor measures the position by becoming exposed along the second length to the pressure in the hydraulic cavity as the first member slides relative to the second member.

20. The apparatus of claim 19, wherein the first optical sensor comprises a reference sensor for the second optical sensor.

21. The apparatus of claim 19, wherein the first optical sensor spans a first length of the hydraulic cavity, but wherein the first length is always exposed to the pressure in the hydraulic cavity regardless of the position of the first member.

22. The apparatus of claim 19, wherein the first and second optical sensors measure the position by respectively measuring first and second time delays.

23. The apparatus of claim 22, wherein the first and second time delays are compared to determine the position.

24. The apparatus of claim 19, wherein the first and second optical sensors measure the position by respectively measuring first and second phase shifts.

25. The apparatus of claim 19, wherein the first and second optical sensors measure the position by respectively measuring first and second wavelength shifts in the optical sensor.

26. The apparatus of claim 11, wherein the first and second sensors are multiplexed.

27. The apparatus of claim 11, wherein the first and second sensors additionally measure dynamic pressure disturbances within the second member.

28. The apparatus of claim 27, wherein the dynamic pressure disturbances are indicative of a fluid flow within the second member.

29. A hydraulically activated sleeve assembly coupled to a pipe, comprising:
a hydraulic cavity for moving a sleeve along the axis of the pipe; and
first and second optical sensors for sensing pressure in the hydraulic cavity to determine the position of the sleeve relative to the pipe.

30. The assembly of claim 29, wherein the hydraulic cavity and the sleeve are concentric with the pipe.

31. The assembly of claim 29, wherein the hydraulic cavity and the sleeve surround the pipe.

32. The assembly of claim 29, wherein either or both of the first and second optical sensors comprise a winding of fiber optic cable.

33. The assembly of claim 32, wherein either or both of the first and second optical sensors are wound around the hydraulic cavity.

34. The assembly of claim 29, wherein either or both of the first and second optical sensors are bounded by reflectors.

35. The assembly of claim 34, wherein the reflectors are FBGs.

36. The assembly of claim 29, wherein either or both of the first and second optical sensors comprise at least one FBG.

37. The assembly of claim 29, wherein the second optical sensor spans a second length of the hydraulic cavity, and wherein the second optical sensor measures the position by becoming exposed along the second length to the pressure in the hydraulic cavity as the sleeve slides relative to the pipe.

38. The assembly of claim 37, wherein the first optical sensor comprises a reference sensor for the second optical sensor.

39. The assembly of claim 37, wherein the first optical sensor spans a first length of the hydraulic cavity, but wherein the first length is always exposed to the pressure in the hydraulic cavity regardless of the position of sleeve.

40. The assembly of claim 37, wherein the first and second optical sensors measure the position by respectively measuring a first and second time delays.

41. The assembly of claim 40, wherein the first and second time delays are compared to determine the position.

42. The assembly of claim 37, wherein the first and second optical sensors measure the position by respectively measuring a first and second phase shift.

43. The assembly of claim 29, wherein the first and second sensors measure the position by respectively measuring and comparing first and second wavelength shifts.

44. The assembly of claim 29, further comprising a housing affixed to the pipe for housing the hydraulic cavity and the sleeve.

45. The assembly of claim 29, wherein the first and second sensors are multiplexed.

46. The assembly of claim 29, wherein the first and second sensors additionally measure dynamic pressure disturbances within the pipe.

47. The assembly of claim 47, wherein the dynamic pressure disturbances are indicative of a fluid flow within the pipe.

48. A sliding sleeve valve for a pipe, comprising:
   a housing coupled to the pipe for defining a hydraulic cavity for pushing a sleeve along an axis of the pipe; and
   at least one optical reference sensor for sensing the pressure within the hydraulic cavity; and
   at least one optical position sensor which is exposed along a first length to the pressure within the hydraulic cavity as the sleeve slides in the housing to determine the position of the sleeve with respect to the housing.

49. The valve of claim 48, wherein the hydraulic cavity and the sleeve are concentric with the pipe.

50. The valve of claim 48, wherein the hydraulic cavity and the sleeve surround the pipe.

51. The valve of claim 48, wherein either or both of the reference and position sensors comprise windings of fiber optic cable.

52. The valve of claim 51, wherein either or both of the sensors are wound around the hydraulic cavity.

53. The valve of claim 48, wherein either or both of the reference and position sensors are bounded by reflectors.

54. The valve of claim 53, wherein the reflectors are FBGs.

55. The valve of claim 48, wherein either or both of the reference and position sensors comprise at least one FBG.

56. The valve of claim 48, wherein reference sensor is exposed along a second length to the pressure within the hydraulic cavity, but wherein the second length is fully exposed to the pressure in the hydraulic cavity regardless of the position of the sleeve.

57. The valve of claim 56, wherein the reference and position sensors respectively measure first and second time delays.

58. The valve of claim 57, wherein the first and second time delays are compared to determine the position.

59. The valve of claim 48, wherein the reference and position sensors respectively measure first and second phase shifts.

60. The valve of claim 48, wherein the position sensor measures the position by measuring at least one wavelength shift.

61. The valve of claim 48, wherein the reference and position sensors are multiplexed.

62. The valve of claim 48, further comprising two reference sensors and two position sensors as claimed, and wherein a first reference sensor and a first position sensor are located proximate to a first end of the housing and where a second reference sensor and a second position sensor are located proximate to a second end of the housing.

63. The valve of claim 62, wherein the first and second reference sensors and the first and second position sensors are multiplexed.

64. The valve of claim 48, wherein the reference and position sensors additionally measure dynamic pressure disturbances within the pipe.

65. The valve of claim 64, wherein the dynamic pressure disturbances are indicative of a fluid flow within the pipe.

* * * * *